United States Patent
Sone et al.

(10) Patent No.: US 9,954,239 B2
(45) Date of Patent: Apr. 24, 2018

(54) SOLID POLYMER POWER GENERATION OR ELECTROLYSIS METHOD AND SYSTEM

(71) Applicant: Japan Aerospace Exploration Agency, Chofu-shi, Tokyo (JP)

(72) Inventors: Yoshitsugu Sone, Chofu (JP); Masato Sakurai, Chofu (JP); Asuka Shima, Chofu (JP); Minoru Umeda, Nagaoka (JP); Tetsuya Nakabeppu, Tokyo (JP); Ryota Shinozaki, Tokyo (JP); Toru Kinoshita, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 144 days.

(21) Appl. No.: 15/021,486

(22) PCT Filed: Sep. 10, 2014

(86) PCT No.: PCT/JP2014/073950
§ 371 (c)(1),
(2) Date: Mar. 11, 2016

(87) PCT Pub. No.: WO2015/037625
PCT Pub. Date: Mar. 19, 2015

(65) Prior Publication Data
US 2016/0226090 A1  Aug. 4, 2016

(30) Foreign Application Priority Data

Sep. 12, 2013 (JP) .................................. 2013-189617
Sep. 12, 2013 (JP) .................................. 2013-189618

(51) Int. Cl.
*H01M 8/00* (2016.01)
*H01M 8/1007* (2016.01)
(Continued)

(52) U.S. Cl.
CPC ............. *H01M 8/1007* (2016.02); *C25B 1/00* (2013.01); *C25B 1/02* (2013.01); *C25B 1/04* (2013.01);
(Continued)

(58) Field of Classification Search
CPC ...................................................... H01M 8/00
See application file for complete search history.

(56) References Cited

U.S. PATENT DOCUMENTS

2008/0241638 A1* 10/2008 McElroy ........... H01M 8/04156
429/415
2012/0003552 A1* 1/2012 Barnett ..................... C25B 1/02
429/422

FOREIGN PATENT DOCUMENTS

JP        5-205764 A      8/1993
JP    2002-500806 A      1/2002
(Continued)

OTHER PUBLICATIONS

International Search Report dated Dec. 16, 2014, issued in counterpart Application No. PCT/JP2014/073950 (2 pages).

*Primary Examiner* — Jacob Marks
(74) *Attorney, Agent, or Firm* — Westerman, Hattori, Daniels & Adrian, LLP (57) ABSTRACT

There are provided: a solid polymer power generation or electrolysis method that does not require injection of energy from the outside and maintenance of a high temperature, and is capable of converting carbon dioxide to a useful hydrocarbon while producing energy, controlling the production amounts of the hydrocarbons or the like and a ratio sorted by kind of the hydrocarbons, improving utilization efficiency of a product, and simplifying equipment for separation and recovery; and a system for implementing the solid polymer power generation or electrolysis method. Carbon dioxide is supplied to the side of one electrode 111 of a reactor 110

(Continued)

having a membrane electrode assembly 113, hydrogen is supplied to the side of the other electrode 112, and the amounts of the hydrocarbons produced per unit time and the ratio sorted by kind of the hydrocarbons are changed by controlling a power generation voltage of the reactor 110.

15 Claims, 6 Drawing Sheets

(51) Int. Cl.
| | |
|---|---|
| C25B 3/04 | (2006.01) |
| H01M 8/18 | (2006.01) |
| C25B 15/08 | (2006.01) |
| C25B 9/10 | (2006.01) |
| H01M 8/2457 | (2016.01) |
| C25B 1/00 | (2006.01) |
| C25B 1/02 | (2006.01) |
| C25B 3/02 | (2006.01) |
| C25B 13/08 | (2006.01) |
| H01M 8/04089 | (2016.01) |
| H01M 8/04701 | (2016.01) |
| H01M 8/04828 | (2016.01) |
| H01M 8/04858 | (2016.01) |
| H01M 8/06 | (2016.01) |
| H01M 8/0656 | (2016.01) |
| H01M 8/1011 | (2016.01) |
| H01M 8/241 | (2016.01) |
| H01M 8/2455 | (2016.01) |
| H01M 8/2495 | (2016.01) |
| H01M 16/00 | (2006.01) |
| C25B 1/04 | (2006.01) |
| C25B 5/00 | (2006.01) |
| H01M 8/1018 | (2016.01) |

(52) U.S. Cl.
CPC ............... *C25B 3/02* (2013.01); *C25B 3/04* (2013.01); *C25B 5/00* (2013.01); *C25B 9/10* (2013.01); *C25B 13/08* (2013.01); *C25B 15/08* (2013.01); *H01M 8/04097* (2013.01); *H01M 8/04701* (2013.01); *H01M 8/04835* (2013.01); *H01M 8/04873* (2013.01); *H01M 8/06* (2013.01); *H01M 8/0656* (2013.01); *H01M 8/1011* (2013.01); *H01M 8/1018* (2013.01); *H01M 8/184* (2013.01); *H01M 8/241* (2013.01); *H01M 8/2455* (2013.01); *H01M 8/2457* (2016.02); *H01M 8/2495* (2013.01); *H01M 16/003* (2013.01); *H01M 2008/1095* (2013.01); *H01M 2300/0082* (2013.01); *Y02E 60/366* (2013.01); *Y02E 60/528* (2013.01)

(56) References Cited

FOREIGN PATENT DOCUMENTS

| | | |
|---|---|---|
| WO | 98/50974 A1 | 11/1998 |
| WO | 98/52243 A1 | 11/1998 |
| WO | 2012/118065 A1 | 9/2012 |
| WO | 2012/128148 A1 | 9/2012 |

* cited by examiner

●: 40°C POTENTIAL   ▲: 60°C POTENTIAL   ■: 80°C POTENTIAL
○: 40°C ELECTRIC POWER   △: 60°C ELECTRIC POWER   □: 80°C ELECTRIC POWER

SOLID POLYMER POWER GENERATION OR ELECTROLYSIS METHOD AND SYSTEM

TECHNICAL FIELD

The present invention relates to a solid polymer power generation method and system that supplies carbon dioxide to one of electrodes of a membrane electrode assembly provided with a catalyst layer and supplies hydrogen, water vapor, or liquid water to the other electrode to generate electric power and also produce a hydrocarbon and water, or a solid polymer electrolysis method and system that performs electrolysis and produces a hydrocarbon.

BACKGROUND ART

In recent years, since carbon dioxide emission to the atmosphere resulting from combustion of fossil fuels may significantly affect an ecosystem and the global environment, a reduction in the emission of carbon dioxide is desired globally.

Accordingly, a technique for eliminating the emission of carbon dioxide or reducing the emission amount of carbon dioxide is developed and, as part of the development, a technique for fixing carbon dioxide and a technique for converting carbon dioxide to other compounds are also developed.

In addition, in a completely closed environment such as a space station or a rocket, it is not easy to supply substances, and it is necessary to minimize the supply or emission at an element level.

Accordingly, it is desired to convert produced carbon dioxide to another substance to increase a substance that can be recovered and reduce a supplied or emitted substance as much as possible at the element level.

As a method for alleviating the amount of carbon dioxide in the atmosphere, a method for capturing carbon dioxide and burying it in the ground is specifically promoted.

In addition, there is an attempt to cause carbon dioxide to react with hydrogen by the Sabatier reaction at a high temperature in the vicinity of 300° C. to produce methane, recover the methane, and use the methane as energy that can be readily transferred.

However, each of these methods is a method that injects a large amount of energy for the burial or a method that requires energy for maintaining the high temperature.

As a method and system that suppresses the injection of energy and fixes carbon dioxide, there are proposed a solid polymer power generation method and system that, while generating electricity by a fuel cell reaction with carbon dioxide used as an oxidizing agent by supplying carbon dioxide to the cathode side of a reactor having a membrane electrode assembly provided with a catalyst layer and supplying hydrogen to the anode side thereof, produces an available compound other than carbon monoxide or the like by reducing carbon dioxide during the reaction, and allows recycling of carbon resources (see, e.g., PTL 1 or the like), and a solid polymer electrolysis method and system that supplies water vapor or liquid water, produces a hydrogen ion by electrolyzing the water vapor or liquid water, and uses the hydrogen ion in the reduction reaction of a carbon dioxide gas (see, e.g., PTL 2 or the like).

CITATION LIST

Patent Literature

[PTL 1] WO 2012/128148
[PTL 2] WO 2012/118065

SUMMARY OF INVENTION

Technical Problem

However, in the known art disclosed in PTL 1, production of carbon monoxide is a main operation and, although other compounds such as a hydrocarbon and the like are also produced, no consideration has been given to the control of a production amount and a ratio sorted by kind (a production ratio of a plurality of produced hydrocarbons or the like).

As a result, in order to separate and recover various products, complicated equipment has been required.

In addition, since the use value and use of the compound differ depending on the produced compound, there has been a problem that it is necessary to prepare a plurality of recovery and utilization routes, many pieces of equipment are required for the recovery and utilization, energy has to be injected into these processes, and utilization efficiency is reduced.

To cope with this, as the result of elaborate studies by the present inventors, it has been found that, while generating electricity by the fuel cell reaction with carbon dioxide used as the oxidizing agent by supplying carbon dioxide to the cathode side of the reactor having the membrane electrode assembly provided with the catalyst layer and supplying hydrogen to the anode side thereof, it is possible to reduce carbon dioxide during the reaction.

In addition, it is found that, in the case where liquid water or water vapor is used as a hydrogen source for reducing the carbon dioxide gas, it is possible to perform similar fixation of the carbon dioxide gas/synthesis of other hydrocarbons also in the case where proton (hydrogen ion) is produced by applying only a voltage for electrolyzing minimum water from the outside.

Further, it has been found that, for compounds produced by these reactions, it is possible to control the production amounts and the ratio sorted by kind of a plurality of hydrocarbons produced per unit time in accordance with the voltage, temperature, and humidification conditions during the production.

The present invention solves the problems of the known solid polymer power generation or electrolysis method and system based on the above knowledge, and an object thereof is to provide the solid polymer power generation or electrolysis method and system that does not require the injection of energy from the outside or requires the injection of a small amount of energy, does not require maintenance of a reactor at a high temperature, and is capable of converting carbon dioxide to a useful hydrocarbon, controlling the production amounts of the hydrocarbons or the like and the ratio sorted by kind of the hydrocarbons, producing a large amount of a compound corresponding to a use, improving utilization efficiency of a product, and simplifying equipment for separation and recovery.

Solution to Problem

A first aspect of the present invention is a solid polymer power generation method including supplying carbon dioxide to one of electrodes of a reactor having a membrane electrode assembly provided with a catalyst layer and supplying hydrogen to the other electrode to produce a hydrocarbon and water, or a solid polymer electrolysis method including supplying carbon dioxide to one of the electrodes, supplying water vapor or liquid water as a supply source of hydrogen, generating proton (hydrogen ion) that can react with a carbon dioxide gas by electrolyzing the water vapor or the liquid water, and causing a reaction to produce the hydrocarbon and water.

In addition, a second aspect of the present invention includes controlling a voltage (potential difference) between the electrodes of the reactor or an electrode potential of each electrode, and changing amounts of hydrocarbons produced per unit time and a ratio sorted by kind of the hydrocarbons, whereby the present invention solves the above problems.

In addition to the configuration of the solid polymer power generation or electrolysis method of the first or second aspect, a third aspect of the present invention further includes controlling a temperature of the reactor, and changing the amounts of the hydrocarbons produced per unit time and the ratio sorted by kind of the hydrocarbons, whereby the present invention solves the above problems.

In addition to the configuration of the solid polymer power generation or electrolysis method of any one of the first to third aspects, a fourth aspect of the present invention further includes humidifying at least one of the supplied carbon dioxide and the supplied hydrogen with water, and controlling a degree of the humidification to change the amounts of the hydrocarbons produced per unit time and the ratio sorted by kind of the hydrocarbons, whereby the present invention solves the above problems.

In addition to the configuration of the solid polymer power generation or electrolysis method of any one of the first to fourth aspects, a fifth aspect of the present invention further includes continuously supplying the carbon dioxide and the hydrogen, whereby the present invention solves the above problems.

In addition to the configuration of the solid polymer power generation or electrolysis method of any one of the first to fifth aspects, a sixth aspect of the present invention further includes setting a temperature of the reactor to 200° C. or less, and producing at least one component among methane, methanol, ethanol, propanol, formaldehyde, and acetaldehyde, whereby the present invention solves the above problems.

In addition to the configuration of the solid polymer power generation or electrolysis method of any one of the first to sixth aspects, a seventh aspect of the present invention further includes supplying a carbon dioxide gas to one of the electrodes, supplying water or water vapor to the other electrode, and controlling a voltage applied between the electrodes of the reactor, whereby the present invention solves the above problems.

An eighth aspect of the present invention is solid polymer power generation system or a system that electrolyzes water vapor or water as a hydrogen supply source to cause the water vapor or the water to react with a carbon dioxide gas including a reactor having a membrane electrode assembly provided with a catalyst layer, carbon dioxide supply means for supplying carbon dioxide to one of electrodes of the reactor, hydrogen supply means for supplying hydrogen to the other electrode, and gas-liquid separation means for separating·recovering a product, and the solid polymer power generation or the system includes voltage control means for controlling a voltage (potential difference) between the electrodes of the reactor or an electrode potential of each electrode, whereby the present invention solves the above problems.

In addition to the configuration of the solid polymer power generation or electrolysis system of the eighth aspect, a ninth aspect of the present invention further includes temperature control means for controlling a temperature of the reactor, whereby the present invention solves the above problems.

In a tenth aspect of the present invention, in addition to the configuration of the solid polymer power generation or electrolysis system of the eighth or ninth aspect, humidification means for supplying water for humidification is connected to at least one of the carbon dioxide supply means and hydrogen supply means, whereby the present invention solves the above problems.

In an eleventh aspect of the present invention, in addition to the configuration of the solid polymer power generation or electrolysis system of any one of the eighth to tenth aspects, the gas-liquid separation means has a circulation path through which an unreacted gas is circulated to at least one of the carbon dioxide supply means and the hydrogen supply means again, whereby the present invention solves the above problems.

In a twelfth aspect of the present invention, in addition to the configuration of the solid polymer power generation or electrolysis system of any one of the eighth to eleventh aspects, the reactor, the gas-liquid separation means, and the humidification means have their respective temperature control means that are independent of each other, and the humidification means has humidification control means, whereby the present invention solves the above problems.

In a thirteenth aspect of the present invention, in addition to the configuration of the solid polymer power generation or electrolysis system of any one of the eighth to twelfth aspects, the voltage control means is configured to be capable of producing carbon dioxide and hydrogen by supplying electric power using a reverse reaction, whereby the present invention solves the above problems.

In addition to the configuration of the solid polymer power generation or electrolysis system of any one of the eighth to thirteenth aspects, the solid polymer power generation or electrolysis system of a fourteenth aspect further includes central control means for collectively controlling the voltage control means, the humidification control means, and a plurality of temperature control means in accordance with a kind and an amount of a product to be recovered, whereby the present invention solves the above problems.

A regenerative fuel cell system of a fifteenth aspect is configured by combining the solid polymer power generation or electrolysis system of any one of the eighth to fourteenth aspects with a direct methanol fuel cell system and a water electrolysis function, whereby the present invention solves the above problems.

Advantageous Effects of Invention

According to the solid polymer power generation or electrolysis method of the first aspect and the solid polymer power generation or electrolysis system of the eight aspect, it is possible to reduce carbon dioxide during a reaction while generating electricity by a fuel cell reaction with carbon dioxide used as an oxidizing agent, and obtain the hydrocarbon as a direct product from the fuel cell, and hence injection of energy from the outside is not required or injection of a small amount of energy is required, maintenance of a high-temperature environment is not required, and it is possible to convert carbon dioxide to the useful hydrocarbon while producing energy.

In addition, according to the configuration of the second aspect, by controlling the power generation voltage or the applied voltage between the electrodes of the reactor, it becomes possible to control the production amounts of the hydrocarbons or the like and the ratio sorted by kind of the hydrocarbons, produce a large amount of a compound corresponding to a use, improve utilization efficiency of a product, and simplify equipment for separation and recovery.

Further, the injection of a large amount of energy from the outside and the maintenance of the high-temperature environment are not required and it is possible to simplify the equipment, and hence the present invention is extremely useful as a technique for removing carbon dioxide included in exhaled air of a man in the case where a manned activity is performed in a completely closed environment such as cosmic space and recovering carbon resources.

According to the configurations of the third and ninth aspects, by controlling the temperature of the reactor, it becomes possible to control the production amounts of the hydrocarbons or the like and the ratio sorted by kind of the hydrocarbons more minutely.

According to the configurations of the fourth and tenth aspects, by controlling the degree of the humidification, it becomes possible to control the production amounts of the hydrocarbons or the like and the ratio sorted by kind of the hydrocarbons more minutely.

According to the configuration of the fifth aspect, by continuously supplying carbon dioxide and hydrogen, it becomes possible to perform continuously stable power generation or electrolysis, and produce the hydrocarbon or the like.

According to the configuration of the sixth aspect, the maintenance of the high-temperature environment such as the Sabatier reaction is not required, and it becomes possible to further simplify the equipment.

According to the configuration of the seventh aspect, by optimizing the applied voltage when energy is injected, it is possible to suppress injected energy to a low level and maintain the environment at a low temperature, and further simplify the equipment.

In particular, it is possible to implement execution at a low-temperature environment of 100° C. or less that cannot be implemented by the method or system that uses the Sabatier reaction and the known solid polymer power generation or electrolysis method and system.

According to the configuration of the eleventh aspect, the gas-liquid separation means has the circulation path through which the unreacted gas is circulated to at least one of the carbon dioxide supply means and the hydrogen supply means again, whereby it becomes possible to efficiently operate even in a closed system.

According to the configuration of the twelfth aspect, the gas-liquid separation means and the humidification means have their respective temperature control means that are independent of each other, and the humidification means has the humidification control means, whereby it becomes possible to perform more minute control.

According to the configuration of the thirteenth aspect, the voltage control means is configured to be capable of producing carbon dioxide and hydrogen by supplying electric power using the reverse reaction, whereby it is possible to construct a charge discharge cycle in a state in which a material and a product are closed in the system, and it becomes possible to use the solid polymer power generation or electrolysis system as an extremely safe and useful regenerative fuel cell.

According to the configuration of the fourteenth aspect, the solid polymer power generation or electrolysis system further includes the central control means for collectively controlling the voltage control means, the humidification control means, and the plurality of temperature control means, whereby it is possible to precisely control the production amounts of the hydrocarbons or the like and the ratio sorted by kind of the hydrocarbons while performing power generation or electrolysis more efficiently.

According to the regenerative fuel cell system of the fifteenth aspect, it is possible to construct the cycle in the state in which the material and the product are closed in the system by incorporating the solid polymer power generation or electrolysis system capable of selectively producing methanol, and it becomes possible to use the regenerative fuel cell system as the extremely safe and useful regenerative fuel cell by having methanol and water as components during storage.

REFERENCE SIGNS LIST 100 solid polymer power generation or electrolysis system
110 reactor
111 cathode
112 anode
113 membrane electrode assembly
114 catalyst layer
120 carbon dioxide supply means
121 humidification means (carbon dioxide side)
130 hydrogen supply means (water supply means)
131 humidification means (hydrogen side)
132 carrier gas supply means
133 water storage section
134 heating means
140 gas-liquid separation means (carbon dioxide side)
141 circulation path (carbon dioxide side)
142 circulation pump (carbon dioxide side)
150 gas-liquid separation means (hydrogen side)
151 circulation path (hydrogen side)
152 circulation pump (hydrogen side)
160 central control means
161 voltage control means
162 reactor temperature control means
163 gas-liquid separation means temperature control means (carbon dioxide side)
164 humidification means temperature control means (carbon dioxide side)
165 humidification control means (carbon dioxide side)
166 gas-liquid separation means temperature control means (hydrogen side)
167 humidification means temperature control means (hydrogen side)
168 humidification control means (hydrogen side)
169 heating means temperature control means
170 product separation means
171 product separation means temperature control means
200 direct methanol fuel cell system
300 water electrolysis system

DESCRIPTION OF EMBODIMENTS

A solid polymer power generation or electrolysis method of the present invention is a solid polymer power generation or electrolysis method including supplying carbon dioxide to one of electrodes of a reactor having a membrane electrode assembly provided with a catalyst layer and supplying hydrogen to the other electrode to produce a hydrocarbon and water, and the solid polymer power generation or electrolysis method includes controlling a voltage between a cathode and an anode of the reactor and changing amounts of hydrocarbons produced per unit time and a ratio sorted by kind of the hydrocarbons.

In addition, a solid polymer power generation or electrolysis system of the present invention is a solid polymer power generation or electrolysis system including a reactor having a membrane electrode assembly provided with a catalyst layer, carbon dioxide supply means for supplying carbon dioxide to one of electrodes of the reactor, hydrogen supply means for supplying hydrogen to the other electrode of the reactor, and gas-liquid separation means for separating·recovering a product, and the solid polymer power generation or electrolysis system includes voltage control means for controlling a voltage between the electrodes of the reactor.

As long as each of the solid polymer power generation or electrolysis method and the solid polymer power generation or electrolysis system does not require injection of energy from the outside or requires injection of a small amount of energy, does not require maintenance of the reactor at a high temperature, and is capable of converting carbon dioxide to a useful hydrocarbon while producing energy, controlling the production amounts of the hydrocarbons or the like and the ratio sorted by kind of the hydrocarbons, producing a large amount of a compound corresponding to a use, improving utilization efficiency of a product, and simplifying equipment for separation and recovery, its specific implementation may be any implementation.

It is preferable to set the temperature of a reactor having a membrane electrode assembly (MEA) to 100° C. or less, and maintain a reaction field by continuously supplying gas and circulating the gas on an as needed basis.

In addition, a catalyst of an electrode to which carbon dioxide is supplied is not particularly limited, and the catalyst that is not poisoned by a platinum-ruthenium alloy or methanol produced during a reaction of ruthenium or rhodium is preferable.

It is desirable to supply carbon dioxide and hydrogen after humidifying them and, with this, it becomes possible to sustain stable power generation or electrolysis.

First Embodiment

A first embodiment of a solid polymer power generation or electrolysis system according to the present invention will be described based on the drawings.

Figure 1:
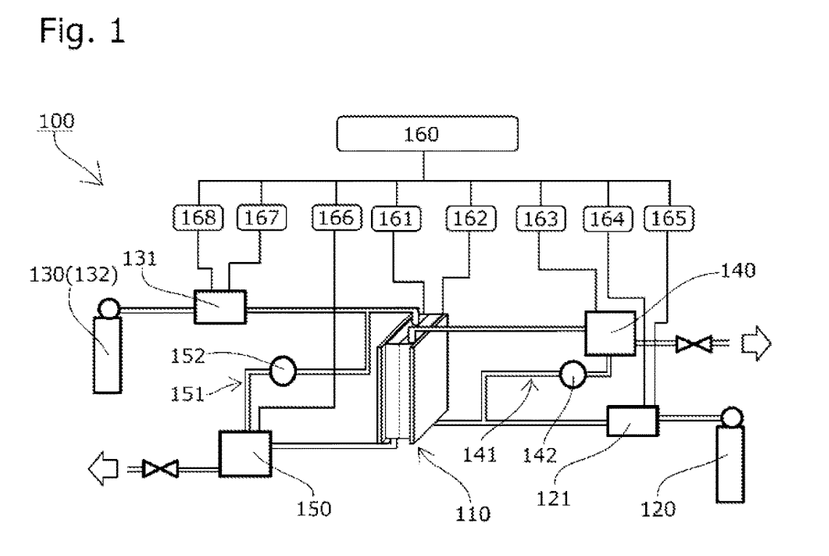
FIG. 1 is an explanatory view of a solid polymer power generation or electrolysis system according to a first embodiment of the present invention.
Figure 2:
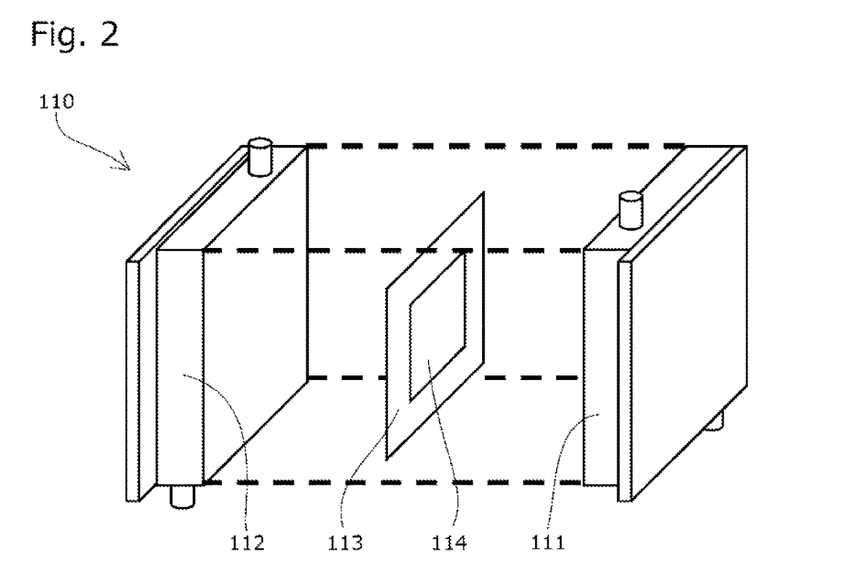
FIG. 2 is an exploded explanatory view of a reactor of FIG. 1.

As shown in FIGS. 1 and 2, a solid polymer power generation or electrolysis system 100 includes a reactor 110 that has a membrane electrode assembly 113 provided with a catalyst layer 114, carbon dioxide supply means 120 for supplying carbon dioxide to the side of a cathode 111 of the reactor 110, hydrogen supply means 130 for supplying hydrogen to the side of an anode 112 of the reactor 110, and gas-liquid separation means 140 and 150 for separating and recovering a product.

Note that the reactor 110 is simplified and the reactor 110 having only one cell is shown for description, but the actual shape thereof is not limited thereto, and it is desirable to dispose a plurality of cells in series so as to form a stack in order to obtain a high power generation voltage as the entire reactor 110.

Humidification means 121 and 131 for supplying water for humidification are connected to paths from the carbon dioxide supply means 120 and the hydrogen supply means 130 to the reactor 110.

The gas-liquid separation means 140 and 150 have circulation paths 141 and 151 through which an unreacted gas is circulated to the paths from the carbon dioxide supply means 120 and the hydrogen supply means 130 to the reactor 110 again, and circulation pumps 142 and 152 are provided in the circulation paths 141 and 151.

Electric power generated by the reactor 110 is supplied to a load that is not shown, and a power generation voltage between one electrode 111 of the reactor 110 and the other electrode 112 thereof is configured to be controllable by voltage control means 161.

The temperature of the reactor 110 is configured to be controllable by reactor temperature control means 162.

The temperatures of the gas-liquid separation means 140 and 150 are configured to be controllable independently of each other by gas-liquid separation means temperature control means 163 and 166.

In addition, the temperatures and humidification amounts of the humidification means 121 and 131 are configured to be controllable independently of each other by humidification means temperature control means 164 and 167 and humidification control means 165 and 168.

Further, the voltage control means 161, the reactor temperature control means 162, the gas-liquid separation means temperature control means 163 and 166, the humidification means temperature control means 164 and 167, and the humidification control means 165 and 168 are configured to be collectively controllable by central control means 160 in accordance with the kind and amount of a product to be recovered.

Effects of the thus-configured solid polymer power generation or electrolysis method and system according to the first embodiment of the present invention will be described below.

Figure 3:
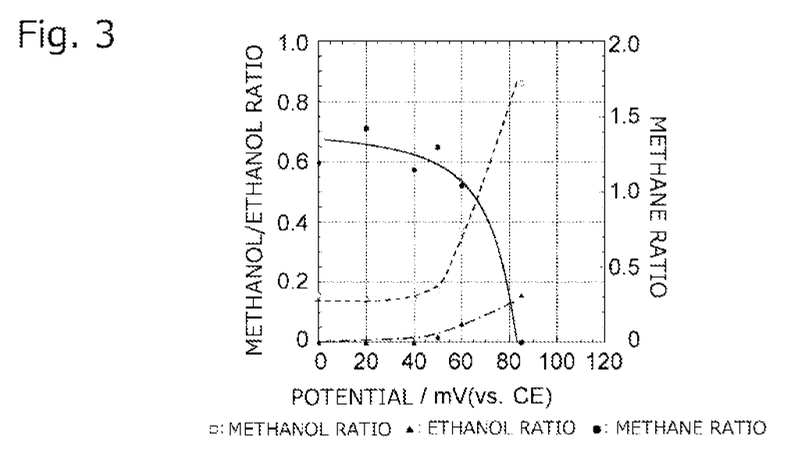
FIG. 3 is a graph showing a relationship between potential/voltage and a produced compound by the solid polymer power generation or electrolysis system according to the first embodiment of the present invention.
Figure 4:
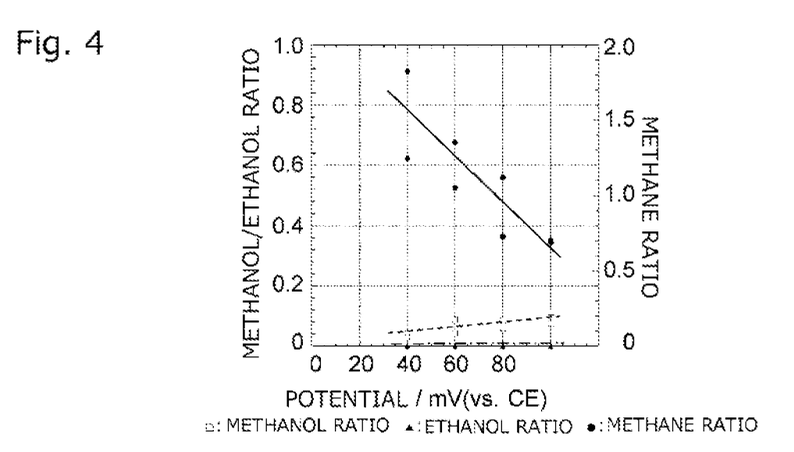
FIG. 4 is a graph showing the relationship between potential/voltage and the produced compound by a solid polymer power generation or electrolysis system according to another embodiment (another catalyst is used).

Compound synthesis ratios obtained when the power generation voltage (potential) between one electrode 111 and the other electrode 112 of the reactor 110 was changed in the reactor 110 in which two types of different Pt/Ru alloy catalysts that were proven in a direct methanol fuel cell (DMFC) were used in the catalyst layer 114 of the membrane electrode assembly 113 are shown in FIGS. 3 and 4.

A graph shown in FIG. 3 is an experiment result in the case where a Pt/Ru-supported carbon having a given composition ratio (hereinafter referred to as Catalyst A) was used as the catalyst under the condition of 1 mg/cm$^2$, and a graph shown in FIG. 4 is an experiment result in the case where a Pt/Ru-supported carbon having another composition ratio (hereinafter referred to as Catalyst B) was used as the catalyst under the condition of 3 mg/cm$^2$.

In either experiment, the power generation voltage (potential) was determined using a counter electrode (hydrogen).

From these experiment results, it is confirmed that the compound synthesis ratio changed depending on the power generation voltage (potential) and an alcohol production ratio becomes lower as the synthesis ratio of methane is higher (reduction becomes larger as the potential is lower), and it is possible to confirm that a hydrocarbon can be selectively produced.

Note that, although not shown in conditions of FIG. 4, production of formaldehyde was confirmed in an area where the potential was not less than 80 mV.

Figure 5:
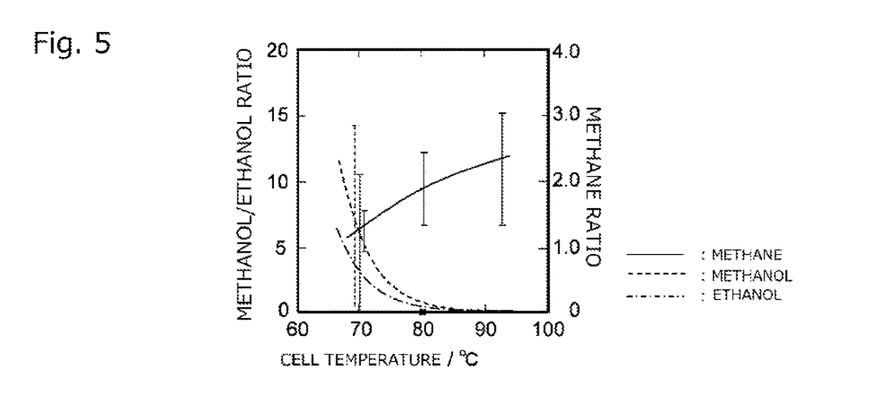
FIG. 5 is a graph showing a relationship between the temperature of the reactor (cell) and the produced compound by the solid polymer power generation or electrolysis system according to the other embodiment.

The compound synthesis ratio obtained when the temperature of the reactor (cell) was changed in the reactor in which Pt/Ru (Catalyst B) was used in the catalyst layer 114 of the membrane electrode assembly 113 under the condition of 3 mg/cm$^2$ is shown in FIG. 5.

Hydrogen was humidified to 100% and supplied under the condition of 50 ml/min, and a measured value at each temperature was plotted with the power generation voltage (potential) between 40 mV and 60 mV.

The vertical range display indicates a range of the measured value of each of methane, methanol, and ethanol at each temperature between 40 mV and 60 mV, and a curve graph indicates a curve of a tendency depending on the temperature.

It is possible to confirm that the composition ratio of the hydrocarbon changes depending on the temperature of the reactor (cell), and methane and the other alcohols have opposing increase/decrease tendencies.

Figure 6:
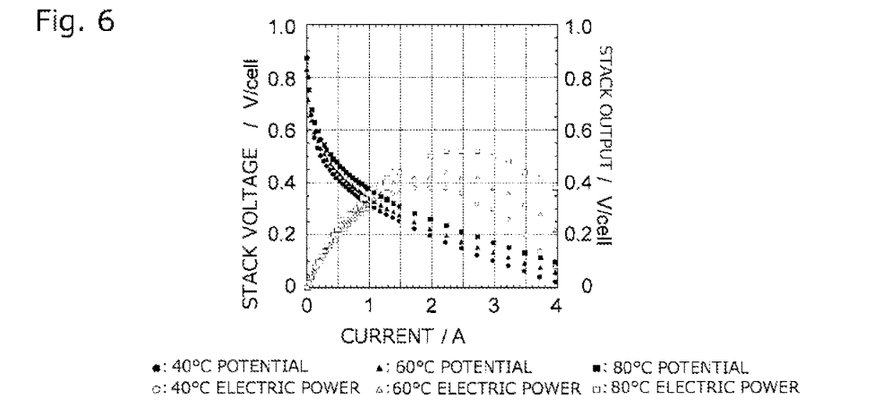
FIG. 6 is a graph showing a relationship between the temperature of the reactor (stack) and potential/voltage by the solid polymer power generation or electrolysis system according to the first embodiment of the present invention.
Figure 7:
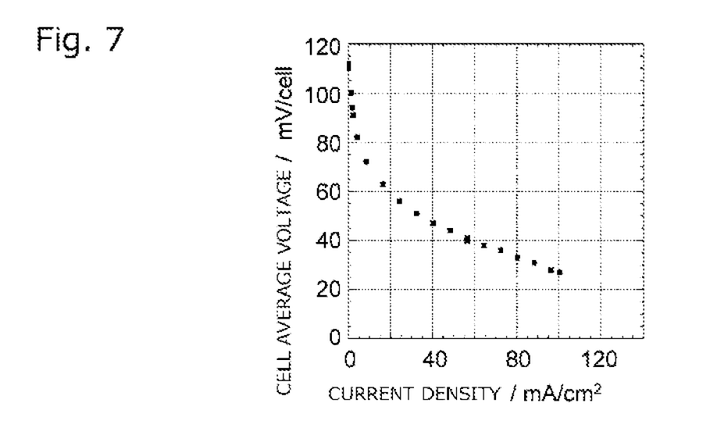
FIG. 7 is a graph showing a relationship between the potential/voltage and a current density of the reactor (cell) by the solid polymer power generation or electrolysis system according to the first embodiment of the present invention.
Figure 8:
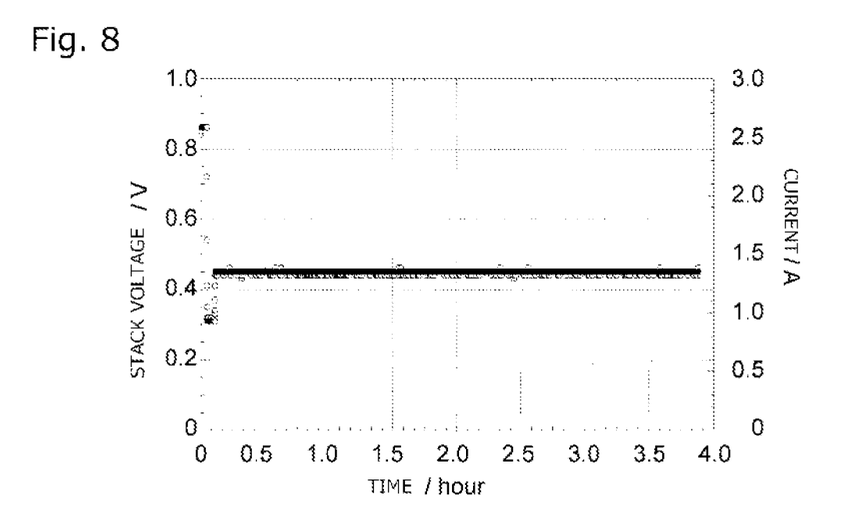
FIG. 8 is a graph showing the voltage of the reactor (stack) during a continuous operation by the solid polymer power generation or electrolysis system according to the first embodiment of the present invention.

Power generation performance obtained when the reactor 110 had an 8-cell stack is shown in FIGS. 6 to 8.

FIG. 6 is a graph of voltage with respect to current and output with respect to current at a plurality of temperatures of the reactor, FIG. 7 is a graph of cell average potential with respect to current density when the temperature of the reactor was set to 80° C., and FIG. 8 is a graph of voltage with respect to time and current with respect to time when a continuous operation was performed with the temperature of the reactor set to 80° C.

In either graph, a stack of an effective electrode area 30 cm$^2$×8 cells was used, and hydrogen and carbon dioxide were supplied under the condition of 2.5 L/min.

As shown in FIGS. 6 and 7, power generation is reliably allowed under the above conditions.

In addition, as shown in FIG. 8, power generation was unstable only immediately after the start of the power generation, but was stabilized shortly, a voltage fluctuation scarcely occurred during the operation period of about 4 hours, and the stable power generation was continued.

In addition, according to the above-described solid polymer power generation or electrolysis method and system, it is possible to control the production of other hydrocarbons by appropriately setting conditions such as the voltage and temperature of the reactor (cell).

Figure 9:
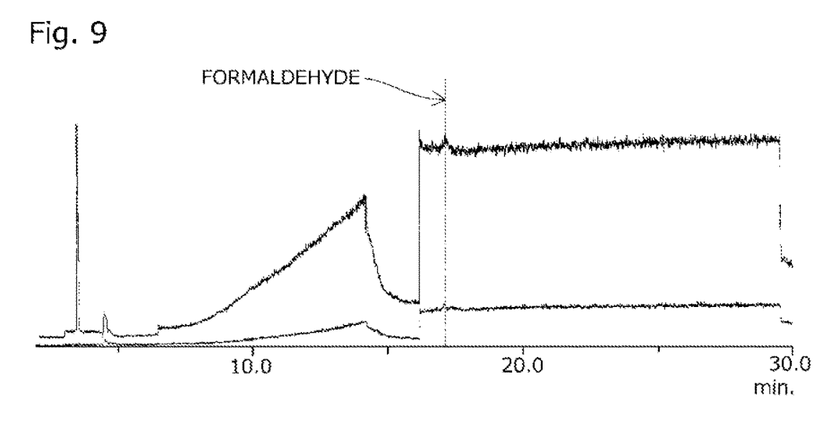
FIG. 9 is a graph showing production of formaldehyde by the solid polymer power generation or electrolysis system according to the first embodiment of the present invention.

For example, from an analysis using a chromatograph of the product when the voltage was set to 60 mV and the temperature was set to 80° C., as shown in FIG. 9, the production of formaldehyde was confirmed.

Figure 10:
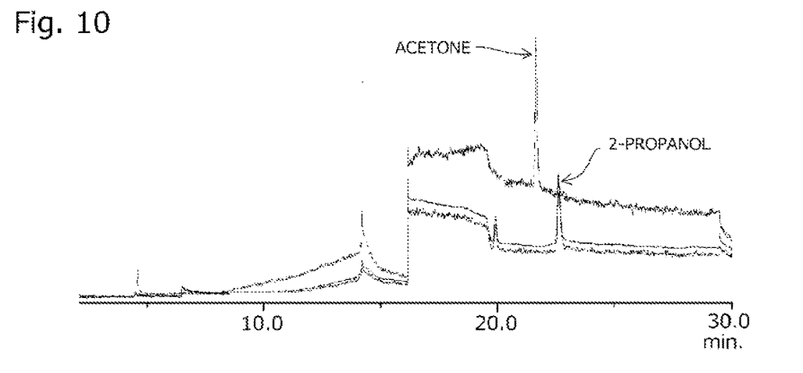
FIG. 10 is a graph showing production of acetone and 2-propanol by the solid polymer power generation or electrolysis system according to the first embodiment of the present invention.

In addition, from the analysis using the chromatograph of the product when the voltage was set to 60 mV and the temperature was set to 95° C., as shown in FIG. 10, the production of acetone and 2-propanol was confirmed.

According to the above-described solid polymer power generation or electrolysis method and system, it is not necessary to inject energy from the outside and it is not necessary to maintain the reactor at a high temperature.

Further, it is possible to convert carbon dioxide to a useful hydrocarbon while producing energy, and it becomes possible to control the production amounts of the hydrocarbons or the like and the ratio sorted by kind of the hydrocarbons.

With this, it becomes possible to produce a large amount of the compound corresponding to the use, and it is possible to improve the utilization efficiency of the product and simplify the equipment for the separation and recovery.

By utilizing such characteristics to specialize in the production of ethanol having an extremely high use value as a material and an energy source in various industries, it becomes possible to fix carbon dioxide, and produce useful ethanol while supplying energy by power generation, and it becomes possible to solve an environmental problem, an energy problem, and a resource problem.

Figure 11:
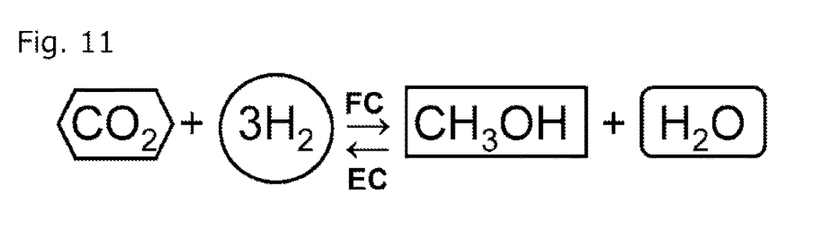
FIG. 11 is an explanatory view of a reaction when the solid polymer power generation or electrolysis system according to the first embodiment of the present invention is used as a regenerative fuel cell.

In addition, in the case where methanol is produced based on the specialization in methanol, as shown in FIG. 11, a reversible reaction occurs in charge•discharge, and hence by combination with another fuel cell or controlling the voltage control means 161 of the solid polymer power generation or electrolysis system 100 of the present invention to cause it to operate as the fuel cell, it is possible to construct a cycle in a state in which the material and the product are closed in the system, and it becomes possible to use the solid polymer power generation or electrolysis system 100 as an extremely safe and useful regenerative fuel cell.

Figure 12:
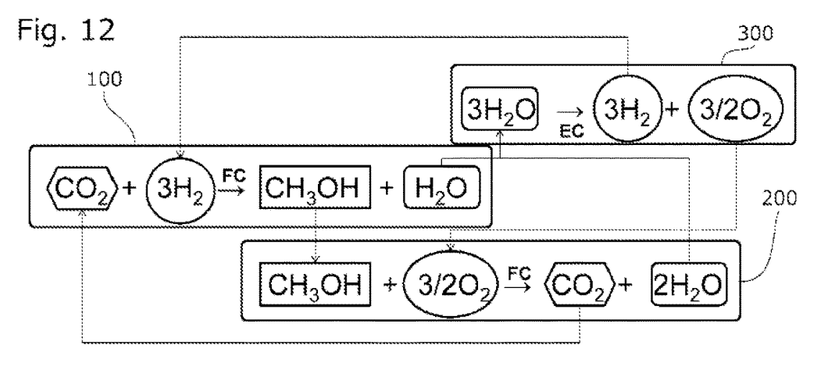
FIG. 12 is a reference diagram of a carbon recycle system to which the solid polymer power generation or electrolysis system according to the present invention is applied.

Further, as shown in FIG. 12, by combining the above-described solid polymer power generation or electrolysis system 100 with a direct methanol fuel cell system 200 and a water electrolysis system 300, it is possible to construct the solid polymer power generation or electrolysis system 100 as the regenerative fuel cell system having a 3-step path, and it is possible to construct the cycle in the state in which the material and the product are closed in the system and it becomes possible to use the solid polymer power generation or electrolysis system 100 as the extremely safe and useful regenerative fuel cell by having methanol and water as components during storage.

Furthermore, as a technique for controlling a completely closed environment such as a space station or a rocket, it is possible to use the solid polymer power generation or electrolysis system 100 effectively from the viewpoints of carbon dioxide removal, circulation at an element level, and energy production.

Note that, in the above-described solid polymer power generation or electrolysis method and system, the voltage is not applied between the cathode and the anode of the reactor, but the voltage may also be applied while the reactor does not generate electric power or is generating electric power.

Second Embodiment

Hereinbelow, a second embodiment in which the voltage is applied between the electrodes will be described by using FIGS. 1 and 2.

In the case where the voltage is applied between one electrode 111 and the other electrode 112, electric power is supplied from a power supply section that is not shown, and the applied voltage between the electrode 111 and the electrode 112 of the reactor 110 can be configured to be controllable by the voltage control means 161.

Further, the temperature of the reactor 110 is preferably configured to be controllable by the reactor temperature control means 162.

The humidification means 121 for supplying water for humidification is connected to the path from the carbon dioxide supply means 120 to the reactor 110.

Water supply means is configured to supply water or water vapor to the reactor 110 by humidifying a carrier gas supplied from carrier gas supply means 132 using the humidification means 131.

The gas-liquid separation means 140 has the circulation path 141 though which the unreacted gas is circulated to the path from the carbon dioxide supply means 120 to the reactor 110 again, and the circulation pump 142 is provided in the circulation path 141.

The gas-liquid separation means 150 has the circulation path 151 through which the carrier gas and unreacted water vapor are circulated to a path from the water supply means to the reactor 110 again, and the circulation pump 152 is provided in the circulation path 151.

The temperatures of the gas-liquid separation means 140 and 150 are configured to be controllable independently of each other by the gas-liquid separation means temperature control means 163 and 166.

In addition, the temperatures and humidification amounts of the humidification means 121 and 131 are configured to be controllable independently of each other by the humidification means temperature control means 164 and 167 and the humidification control means 165 and 168.

Further, the voltage control means 161, the reactor temperature control means 162, the gas-liquid separation means temperature control means 163 and 166, the humidification means temperature control means 164 and 167, and the humidification control means 165 and 168 are configured to be collectively controllable by the central control means 160 in accordance with the kind and amount of the product to be recovered.

Note that the carrier gas may be any gas as long as the gas has stable properties to the reaction in the reactor and the product such as nitrogen, argon, or helium.

Furthermore, the carrier gas may contain hydrogen and, in this case, it is possible to supply hydrogen irrespective of electrolysis in the reactor, and hence injection of a smaller amount of energy is sufficient, and energy recovery is allowed depending on the amount of hydrogen supplied.

According to the above solid polymer power generation or electrolysis method and system according to the second embodiment, it becomes possible to control the production of other hydrocarbons by appropriately setting conditions such as the voltage and temperature of the reactor.

For example, similarly to the case of the solid polymer power generation or electrolysis method and system according to the first embodiment, from the analysis using the chromatograph of the product when the voltage was set to 60 mV (This "voltage" denotes the voltage generated by power generation. The "voltage" denotes the applied voltage when water vapor or water is supplied) and the temperature was set to 80° C., it was possible to confirm the production of formaldehyde.

In addition, from the analysis using the chromatograph of the product when the voltage was set to 60 mV (This "voltage" denotes the voltage generated by power generation. The "voltage" denotes the applied voltage when water vapor or water is supplied) and the temperature was set to 95° C., it was possible to confirm the production of acetone and 2-propanol.

Third Embodiment

Next, a third embodiment in which the voltage is applied between the cathode and anode will be described based on FIG. 13.

Figure 13:
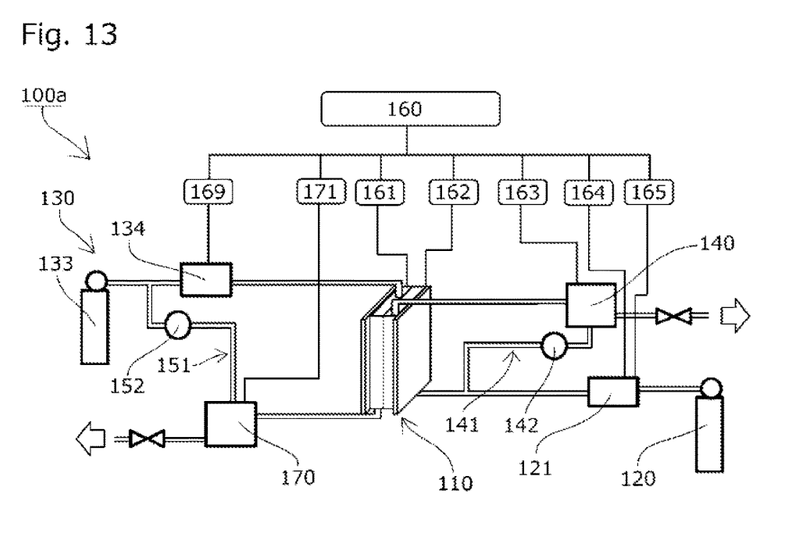
FIG. 13 is an explanatory view of a solid polymer power generation or electrolysis system according to a third embodiment of the present invention.

A solid polymer power generation or electrolysis system 100a according to the third embodiment is configured without using the carrier gas and, as shown in FIG. 13, the reactor 110, the carbon dioxide supply means 120, and the gas-liquid separation means 140 are the same as those of the solid polymer power generation or electrolysis system 100 according to the second embodiment.

The water supply means 130 is configured to adjust the temperature of water supplied from a water storage section 133 using heating means 134 and supply the water to the reactor 110 as water vapor.

Product separation means 170 has the circulation path 151 through which unreacted water or water vapor is circulated to the path from the water supply means 130 to the reactor 110 again, and the circulation pump 152 is provided in the circulation path 151.

Electric power supplied to the reactor 110 is supplied by a power supply section that is not shown, and the applied voltage between the electrode 111 and the electrode 112 of the reactor 110 is configured to be controllable by the voltage control means 161.

The temperature of the reactor 110 is configured to be controllable by the reactor temperature control means 162.

The temperature of the gas-liquid separation means 140 is configured to be controllable independently by the gas-liquid separation means temperature control means 163.

The temperature and humidification amount of the humidification means 121 are configured to be controllable independently of each other by the humidification means temperature control means 164 and the humidification control means 165.

The temperature of the heating means 134 is configured to be controllable independently by heating means temperature control means 169.

The temperature of the product separation means 170 is configured to be controllable independently by product separation means temperature control means 171.

Further, the voltage control means 161, the reactor temperature control means 162, the gas-liquid separation means temperature control means 163, the humidification means temperature control means 164, the humidification control means 165, the heating means temperature control means 169, and the product separation means temperature control means 171 are configured to be collectively controllable by the central control means 160 in accordance with the kind and amount of the product to be recovered.

Note that "the reactor" may perform only electrolysis in the solid polymer power generation or electrolysis method and system according to the second or third embodiment.

That is, there is provided the solid polymer electrolysis method including supplying carbon dioxide to the side of one of the electrodes of the reactor having the membrane electrode assembly provided with the catalyst layer and supplying water or water vapor to the side of the other electrode to produce the hydrocarbon.

In addition, it is also possible to supply water vapor or water as the hydrogen source, electrolyze the water vapor or the water to produce proton (hydrogen ion), reduce the carbon dioxide gas, and synthesize the similar hydrocarbon and, at this point, the solid polymer electrolysis method may include controlling the applied voltage between the electrodes of the reactor and changing the amounts of the hydrocarbons produced per unit time and the ratio sorted by kind of the hydrocarbons.

Further, there may also be provided the solid polymer electrolysis system including the reactor having the membrane electrode assembly provided with the catalyst layer, the carbon dioxide supply means for supplying carbon dioxide to the side of one of the electrodes of the reactor, the water supply means for supplying water or water vapor to the side of the other electrode of the reactor, and the gas-liquid separation means for separating •recovering the product, and the solid polymer electrolysis system may include the voltage control means for controlling the applied voltage between the electrodes of the reactor.

In addition, the solid polymer electrolysis system or the solid polymer electrolysis method may include part or all of features described in the embodiments described above.

Even in the configuration that performs power generation, in the case where water or water vapor is supplied, it is possible to apply the voltage to perform electrolysis in the reactor, and efficiently produce the product that is desired to be recovered with sufficient electric power.

INDUSTRIAL APPLICABILITY

The present invention can be used as control means for power generation or electrolysis that uses a solid polymer and a closed environment.

The invention claimed is:
1. A solid polymer power generation or electrolysis system including a reactor having a membrane electrode assembly provided with a catalyst layer, a carbon dioxide supplier to supply carbon dioxide to one of electrodes of the reactor, a supplier of hydrogen, water vapor, or liquid water to the other electrode, and a gas-liquid separator to separate/recover a product,
the solid polymer power generation or electrolysis system comprising a voltage controller to control a voltage between the electrodes of the reactor.

2. The solid polymer power generation or electrolysis system according to claim 1, further comprising a temperature controller to control a temperature of the reactor.

3. The solid polymer power generation or electrolysis system according to claim 1, wherein
a humidifier to supply water for humidification is connected to at least one of the carbon dioxide supplier and hydrogen supplier.

4. The solid polymer power generation or electrolysis system according to claim 1, wherein
the gas-liquid separator has a circulation path through which an unreacted gas is circulated to at least one of the carbon dioxide supplier and hydrogen supplier.

5. The solid polymer power generation or electrolysis system according to claim 1, wherein
the reactor, the gas-liquid separator, and the humidifier have their respective temperature controller that are independent of each other, and
the humidifier has humidification controller.

6. The solid polymer power generation or electrolysis system according to claim 1, wherein
the voltage controller is configured to be capable of producing carbon dioxide and hydrogen using a reverse reaction by supplying electric power.

7. The solid polymer power generation or electrolysis system according to claim 1, further comprising a central controller to collectively control the voltage controller, humidification controller, and a plurality of temperature controller in accordance with a kind and an amount of a product to be recovered.

8. A regenerative fuel cell system configured by combining the solid polymer power generation or electrolysis system according to claim 1 with a direct methanol fuel cell system and a water electrolysis function.

9. A solid polymer power generation or electrolysis method using the solid polymer power generation or electrolysis system according to claim 1 comprising supplying carbon dioxide to one electrode of a reactor having a membrane electrode assembly provided with a catalyst layer and supplying hydrogen, water vapor, or liquid water to the other electrode to produce a hydrocarbon.

10. The solid polymer power generation or electrolysis method according to claim 9, comprising:
controlling a voltage generated by power generation between electrodes of the reactor or an electrolysis voltage applied from the outside; and
changing amounts of hydrocarbons produced per unit time and a ratio sorted by kind of the hydrocarbons.

11. The solid polymer power generation or electrolysis method according to claim 9, further comprising:
controlling a temperature of the reactor; and
changing amounts of hydrocarbons produced per unit time and a ratio sorted by kind of the hydrocarbons.

12. The solid polymer power generation or electrolysis method according to claim 9, further comprising:
humidifying at least one of the supplied carbon dioxide and the supplied hydrogen with water, and
controlling a degree of the humidification to change amounts of hydrocarbons produced per unit time and a ratio sorted by kind of the hydrocarbons.

13. The solid polymer power generation or electrolysis method according to claim 9, further comprising continuously supplying the carbon dioxide and the hydrogen.

14. The solid polymer power generation or electrolysis method according to claim 9, further comprising:
   setting a temperature of the reactor to 200° C. or less; and
   producing at least one component among methane, methanol, ethanol, propanol, formaldehyde, and acetaldehyde.

15. The solid polymer power generation or electrolysis method according to claim 9, further comprising:
   supplying carbon dioxide to one of the electrodes and supplying water or water vapor to the other electrode; and
   controlling a voltage applied between the electrodes of the reactor to produce at least one component among methane, methanol, ethanol, propanol, formaldehyde, and acetaldehyde.

* * * * *